US012233851B2

(12) United States Patent
Books et al.

(10) Patent No.: US 12,233,851 B2
(45) Date of Patent: Feb. 25, 2025

(54) PLUG-IN ELECTRIC VEHICLES WITH DERATED TRACTION CONTROL UPON SYSTEM FAULTS

(71) Applicant: Cummins Inc., Columbus, IN (US)

(72) Inventors: Martin T. Books, Columbus, IN (US); Jennifer Kay Light-Holets, Greenwood, IN (US); Praveen Chitradurga Muralidhar, Ann Arbor, MI (US); David E. Schisler, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/763,954

(22) PCT Filed: Sep. 24, 2020

(86) PCT No.: PCT/US2020/052416
§ 371 (c)(1),
(2) Date: Mar. 25, 2022

(87) PCT Pub. No.: WO2021/061931
PCT Pub. Date: Apr. 1, 2021

(65) Prior Publication Data
US 2022/0402481 A1 Dec. 22, 2022

Related U.S. Application Data

(60) Provisional application No. 62/906,366, filed on Sep. 26, 2019.

(51) Int. Cl.
B60W 20/00 (2016.01)
B60L 3/00 (2019.01)
(Continued)

(52) U.S. Cl.
CPC ........... *B60W 20/50* (2013.01); *B60L 3/0046* (2013.01); *B60L 3/0053* (2013.01); *B60L 3/08* (2013.01);
(Continued)

(58) Field of Classification Search
CPC ...... B60W 20/50; B60W 20/13; B60W 10/08; B60W 50/0205; B60W 50/038;
(Continued)

(56) References Cited

U.S. PATENT DOCUMENTS 5,627,752 A 5/1997 Buck et al.
7,849,944 B2 12/2010 DeVault
(Continued)

OTHER PUBLICATIONS

Supplementary European Search Report and Written Opinion for European patent application No. 20867433, mailed Oct. 5, 2023.
(Continued)

Primary Examiner — Mahmoud S Ismail
(74) Attorney, Agent, or Firm — Faegre Drinker Biddle & Reath LLP

(57) ABSTRACT

A method for controlling the distribution of power to a traction motor in a plug-in electric vehicle having a plurality of on-board sources of electric power. Power is distributed at a normal power control relationship in response to an operator control input during operation in a normal mode. Power is depleted at a first rate during operation of the vehicle in the normal mode. Power is distributed at a derate power control relationship in response to the operator control input during operation in a derate mode. Power is depleted at a second rate that is less than the first rate during operation in the derate mode to conserve the power of the one or more on-board sources. Operation in the derate mode
(Continued)

can be initiated in response to information from sensors identifying a vehicle condition indicating a battery charge limitation.

20 Claims, 17 Drawing Sheets

(51) Int. Cl.
| | | |
|---|---|---|
| *B60L 3/08* | (2006.01) | |
| *B60L 58/12* | (2019.01) | |
| *B60W 10/08* | (2006.01) | |
| *B60W 20/13* | (2016.01) | |
| *B60W 20/50* | (2016.01) | |
| *B60W 50/02* | (2012.01) | |
| *B60W 50/038* | (2012.01) | |

(52) U.S. Cl.
CPC ............ *B60L 58/12* (2019.02); *B60W 10/08* (2013.01); *B60W 20/13* (2016.01); *B60W 50/0205* (2013.01); *B60W 50/038* (2013.01); B60L 2240/12 (2013.01); B60L 2240/14 (2013.01); B60W 2510/244 (2013.01); B60W 2510/28 (2013.01); B60W 2530/10 (2013.01); B60W 2530/209 (2020.02); B60W 2710/083 (2013.01); B60W 2710/244 (2013.01); B60W 2720/10 (2013.01); B60W 2720/106 (2013.01)

(58) Field of Classification Search
CPC ..... B60W 2530/209; B60W 2510/244; B60W 2510/28; B60W 2530/10; B60W 2710/083; B60W 2710/244; B60W 2720/10; B60W 2720/106; B60L 58/12; B60L 3/0046; B60L 3/0053; B60L 3/08; B60L 2240/12; B60L 2240/14
USPC .......................................................... 701/22
See application file for complete search history.

(56) References Cited

U.S. PATENT DOCUMENTS

| | | | |
|---|---|---|---|
| 8,020,650 | B2 | 9/2011 | Van Maanen et al. |
| 8,307,928 | B2 | 11/2012 | Mack |
| 8,660,729 | B2 | 2/2014 | Miyazaki |
| 2005/0062449 | A1* | 3/2005 | Wang ........................ H02P 3/06 |
| | | | 318/366 |
| 2010/0241301 | A1 | 9/2010 | Yang |
| 2014/0229043 | A1* | 8/2014 | Frank .................... B60W 10/02 |
| | | | 180/65.23 |
| 2014/0277882 | A1* | 9/2014 | Isayeva .................. B60L 3/003 |
| | | | 903/903 |
| 2016/0005423 | A1 | 1/2016 | Neppalli et al. |
| 2017/0120756 | A1* | 5/2017 | Yokoyama ............ F02B 63/042 |
| 2022/0216820 | A1* | 7/2022 | Fukunaga ............... B60L 50/60 |

OTHER PUBLICATIONS

International Search Report and Written Opinion for International patent application No. PCT/US2020/052416, mailed Dec. 21, 2020.
International Preliminary Report on Patentability received for PCT Patent Application No. PCT/US2020/052416, mailed on Apr. 7, 2022, 9 pages.

* cited by examiner

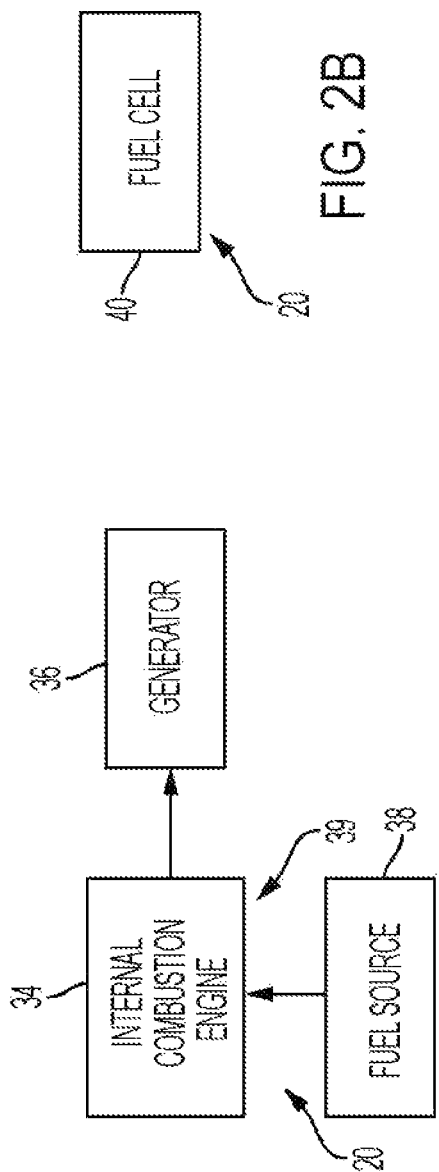
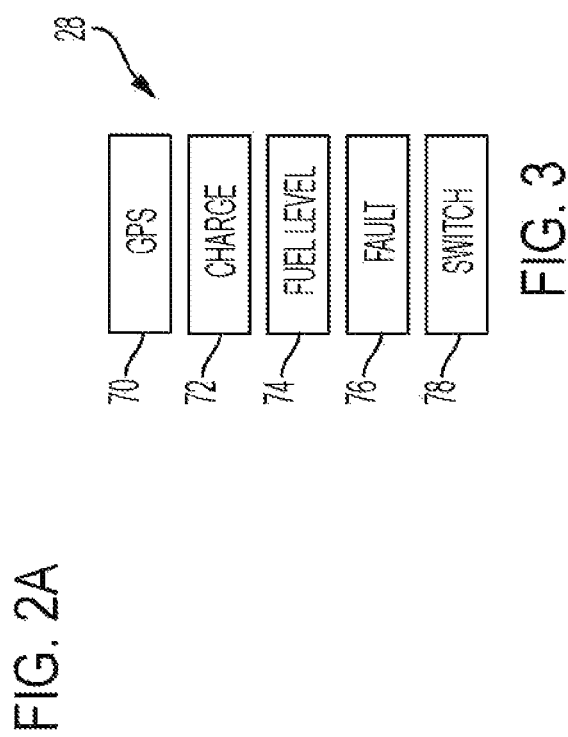

PLUG-IN ELECTRIC VEHICLES WITH DERATED TRACTION CONTROL UPON SYSTEM FAULTS

CROSS-REFERENCE TO RELATED APPLICATIONS

The present application claims priority to International Patent Application No. PCT/US2020/052416, filed Sep. 24, 2020, which claims priority to U.S. Provisional Patent Application No. 62/906,366, filed Sep. 26, 2019, and entitled "PLUG-IN ELECTRIC VEHICLES WITH DERATED TRACTION CONTROL UPON SYSTEM FAULTS," the entire disclosures of which are expressly incorporated by reference herein.

TECHNICAL FIELD

The disclosure relates generally to systems and methods for controlling battery state of charge depletion in electric vehicles. More specifically, the disclosure relates to systems and methods for reducing battery charge depletion in electric vehicles in response to the detection of system faults.

BACKGROUND

Plug-in electric vehicles typically include multiple on-board sources of electrical power. Plug-in hybrid electric vehicles (PHEV), for example, include both an internal combustion engine powered by conventional fuels such as gasoline or diesel, and a battery powered electric motor. One type of PHEV known as a range extended electric vehicle (REEV) includes an auxiliary power unit having an internal combustion engine-powered generator. The electricity generated by the auxiliary power unit can be used to charge the electric motor battery or to directly power the vehicle electric motor.

Sources of fuel for internal combustion engines are readily available. The availability of charging stations to recharge the vehicle battery are more limited. Depletion of the vehicle battery charge can have significant undesirable consequences, such as stranding the vehicle far away from its home base. There remains, therefore, a continuing need for improved systems for enhancing the battery charge and range of plug-in electric vehicles.

SUMMARY

Disclosed embodiments include systems and methods to control the depletion of battery charge in plug-in electric vehicles. In embodiments, vehicle traction control is derated in response to identified system failures or faults to reduce the rate of battery depletion and enhance get-home capability.

Embodiments include a plug-in electric vehicle comprising a traction motor; a rechargeable battery system including one or more batteries; a charger coupled to the rechargeable battery system and connectable to an external electrical source to recharge the rechargeable battery system; an auxiliary electric power source; a power distribution system responsive to power control signals to controllably couple electric power from the rechargeable battery system and the auxiliary electric power source to the traction motor; one or more operator controls to provide operator vehicle control signals; one or more failure sensors, each sensor identifying a vehicle condition indicating a battery charge limitation and providing failure signals representative of the battery charge limitation; and a controller. The controller is coupled to the power distribution system, the one or more operator controls and the one or more failure sensors, and is configured to produce the power control signals and to operate in a normal or first mode and a derate or second mode. The controller produces normal or first traction power control signals in response to the operator control signals during operation in the normal mode, and wherein power of the rechargeable battery system and/or the auxiliary electric power source are depleted at a first rate during operation of the vehicle when the controller is operating in the normal mode. In response to the failure signals, the controller produces derated or second traction power control signals in response to the operator control signals during operation in the derate mode, wherein power of the rechargeable battery system and/or the auxiliary electric power source are depleted at a second rate during operation of the vehicle when the vehicle controller is operating in the derate mode, and wherein the second rate is less than the first rate to conserve the power of the rechargeable battery system and/or the auxiliary power source.

Embodiments include a method for controlling the distribution of power to a traction motor in a plug-in electric vehicle having a plurality of on-board sources of electric power that can be transferred to the traction motor. The method comprises receiving an operator control input; sensing one or more vehicle failure conditions indicating a charge limitation of the plurality of on-board sources of power; and distributing power from one or more of the plurality of on-board sources of power to the traction motor at a first or normal power control relationship and at a second or derated power control relationship. When distributing power at the first or normal power control relationship in response to the operator control input during operation in a first or normal mode in the absence of vehicle failure conditions, power of the one or more on-board sources of power is depleted at a first rate during operation of the vehicle during operation in the first or normal mode. When distributing power from one or more of the plurality of on-board sources of power to the traction motor at a second or derate power control relationship in response to the operator control input during operation in a second or derate mode in response to a sensed vehicle failure condition, power of the one or more on-board sources of power is depleted at a second rate during operation of the vehicle during operation in the second or derate mode. The second rate is less than the first rate to conserve the power of the one or more on-board sources of power.

BRIEF DESCRIPTION OF THE DRAWINGS

FIG. 2A is a diagrammatic illustration of an example auxiliary electric power source that can be used with the vehicle.

FIG. 2B is a diagrammatic illustration of an example auxiliary electric power source that can be used with the vehicle.

FIG. 3 is a diagrammatic illustration of examples of failure sensors that can be used with the vehicle.

DETAILED DESCRIPTION

Figure 1:
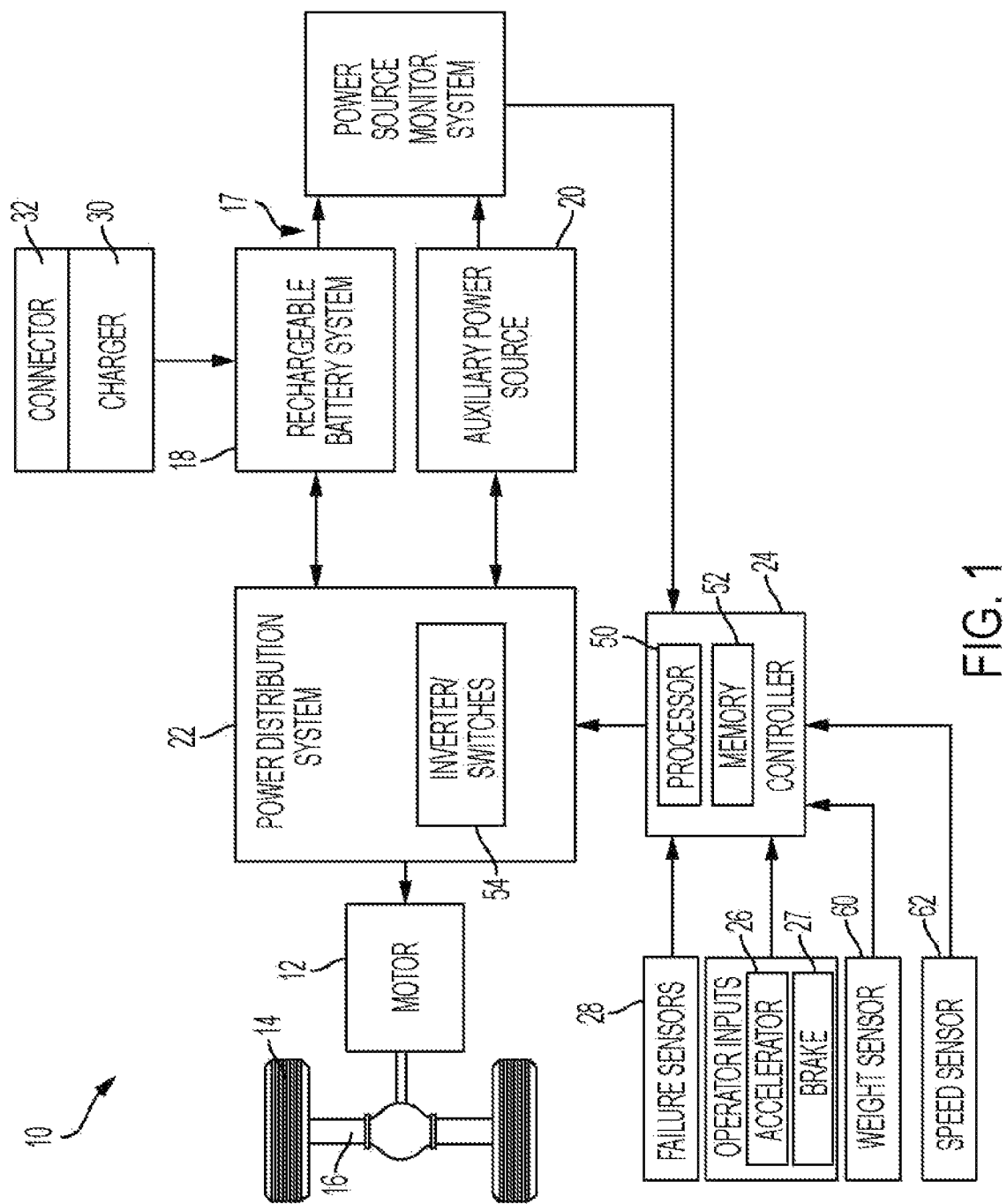
FIG. 1 is a diagrammatic illustration of a plug-in electric vehicle in accordance with embodiments.

FIG. 1 is a diagrammatic block diagram of a plug-in electric vehicle 10 such as an automobile or truck in accordance with embodiments. Vehicle 10 includes one or more electric traction motors 12 coupled to a drive such as wheels 14 by output shaft 16. A plurality of on-board electrical power sources 17 including a rechargeable battery system 18 and an auxiliary electric power source 20 are coupled to the traction motor 12 by power distribution system 22. Power distribution system 22 controls the flow of electric power from the plurality of on-board electrical power sources 17 in response to power control signals provided by a controller 24. The controller 24 is connected to receive a number of inputs including operator vehicle control input signals such as those provided by an accelerator 26, brake 27 and system fault or failure sensors 28. As described in greater detail below, the failure sensors 28 monitor a variety of conditions of the vehicle 10 that indicate power charge limitations of the on-board electrical power sources 17 and provide failure signals representative of those conditions and limitations to the controller 24. The controller 24 is responsive the operator inputs and failure signals, and operates in a number of different modes, including a first or normal mode, and a second or derate mode, to control the power distribution system 22.

For example, in the absence of failure signals from the failure sensors 28, the controller 24 can operate in the normal mode. During normal mode operation the controller 24 produces first or normal power control signals in response to the operator inputs. Power of the on-board power sources 17 will be consumed or depleted at a first rate by operation of the vehicle 10 when the controller 24 is operating in the normal mode. In response to the identification of a vehicle failure condition, the controller 24 can operate in a derate mode. During derate mode operation the controller 24 produces second or derate power control signals in response to the operator inputs. Power of the on-board power sources 17 will be consumed or depleted at a second rate by operation of the vehicle 10 when the controller 24 is operating in the derate mode. The second rate of power depletion is a rate that is less than the first rate, thereby conserving power of the on-board electrical power sources 17. By conserving power in this manner, the vehicle 10 may have "get-home" capability despite possibly unexpected occurrences of the power charge limitations.

Rechargeable battery system 18 can include one or more batteries, and is rechargeable from external sources such as the electrical power grid. The illustrated embodiment of the vehicle 10 includes a charger 30 coupled to the rechargeable battery system 18. Charger 30 has a connector 32 for connection to the external power source (e.g., an electric vehicle charging station).

Auxiliary electric power source 20 can be any of a variety of electric power sources. FIG. 2A, for example, illustrates the auxiliary electric power source 20 as including an internal combustion engine 34 that drives a generator 36. The internal combustion engine 34 can, for example, be a gasoline or diesel fuel powered engine. A fuel source 38 for the internal combustion engine 34 is shown in FIG. 2A. When driven by the internal combustion engine 34, the generator 36 produces electrical power that can be coupled to the traction motor 12 by the power distribution system. The combination of the internal combustion engine 34 and the generator 36 can be characterized as a genset 39. Alternatively or in addition to the genset 39, FIG. 2B illustrates an embodiment of the auxiliary power source 20 that includes a fuel cell 40. Fuel cell 40 produces electrical power that can be coupled to the traction motor 12 by the power distribution system 22. In embodiments, the power distribution system 22 can couple the power from the auxiliary power source 20 directly to the traction motor 12. Alternatively or in addition, in embodiments the power distribution system 22 couples the power from the auxiliary power source 20 to the rechargeable battery system 18 to recharge the rechargeable battery system.

Although only one traction motor 12 is shown in FIG. 1, other embodiments include more than one traction motor. Known or otherwise conventional mechanical transfer mechanisms, including for example clutches, torque converters and transmissions, can be used to couple the one or more traction motors 12 to the wheels 14. Plug-in electric vehicle 12 can take any of wide variety of known or otherwise conventional configurations. For example, embodiments including the internal combustion engine 34 and generator 36 can be configured as plug-in hybrid electric vehicles and range extended electric vehicles. These and other embodiments can be configured as parallel hybrids, series hybrids, and series-parallel hybrids.

When plug-in electric vehicles such as 10 with an auxiliary power source 20 depart from a "home" location or base at the beginning of a trip or "mission," they can be fully charged and/or fueled and therefore have a predetermined or fixed amount of energy onboard. This fixed amount of energy can, for example, be in the form of a fully charged rechargeable battery system 18 and one or both of a full fuel source 38 (e.g., gasoline, diesel or natural gas) in embodiments including a genset 39 and a full fuel cell 40 in embodiments including such a fuel cell. The vehicle 10 is also configured for operation in a first, normal and typically optimized manner based on a variety of parameters such as performance, driving range and/or energy consumption. Under this basis, lesser constraints on energy consumption may be considered wasteful and harmful to the economics of the enterprise of operating the vehicle. For example, greater constraints on parameters such as performance may make the drivability undesirable and diminish operator acceptance of the vehicle 10. This optimized operation of the vehicle 10 can be characterized in part by operating mode features provided by the controller 24. For example, these operating mode features of the controller 24 can characterize the relationship between inputs provided by the operator, such as an amount of acceleration commanded by the operator through the accelerator 26, and the amount of electrical power to be delivered to the motor 12 in response to those operator inputs. In embodiments, controller 24 operates in a first or normal mode characterizing a first or normal relationship between those operator inputs and the amount of power delivered to the motor 12 in response to those inputs.

Operators of the vehicle 10 expect that the vehicle will have sufficient energy to complete its trip or mission and to return to the home base with either the power provided by the fully charged and/or fueled on-board electrical power sources 17, or with any available or expected recharging and/or refueling events during the mission. Those recharging or refueling events may for example, be relatively brief or longer recharging of the rechargeable battery system 18 at a charging station, the refueling of fuel source 38 at a fuel station, or refueling or replacing the fuel cell 40. However, there may be any of a number of vehicle operating conditions that occur during the trip, referred to herein generally as "faults" or "failures," that may result in limitations on the amount of energy available on board the vehicle. These vehicle operating conditions can include conditions indicating power limitations of the rechargeable battery system 18 and/or the auxiliary power source 20. Nonlimiting examples of such vehicle failure conditions include (1) the failure or inability to recharge the rechargeable battery system 18 at an expected stop during the mission at a charging station, (2) the failure or inability to refuel the fuel source 38 and/or fuel cell 40 at an expected stop during the mission, (3) unexpected low fuel availability in the fuel source 38 and/or fuel cell 40, (4) unexpected or other faults in the rechargeable battery system 18, internal combustion engine 34, generator 36 and/or fuel cell 40, and (5) other conditions identified by the operator that cause the operator to be concerned about the availability of sufficient energy capacity to complete the mission (i.e., "get home" capability).

In response to the identification of these or other failure events, vehicle 10 operates in a manner that results in a lower rate of power consumption to enhance the range of the vehicle and provide get home capability. Operation in this manner typically places constraints on the operation of the vehicle 10 with respect to the optimized operating characteristics of the vehicle (e.g., reduced drivability). Such additional constraints may not be acceptable in connection with normal operation and performance of the vehicle, but are a "lesser evil" and acceptable if get home capability is at risk. Under these circumstances the drivability of the vehicle is temporarily reduced to enhance the get home capability.

In embodiments, the get home capability of vehicle 10 is enhanced in response to the identification of a failure event by derating the performance of the vehicle in a manner that will enhance the range of the vehicle (i.e., by operating the vehicle in a less than performance-optimized manner). In embodiments, the derates for enhanced get home capability can be achieved by operating the vehicle in any of one or more second or derated operating modes provided by controller 24. For example, by these operating modes the controller 24 can characterize the relationship between inputs provided by the operator, such as an amount of acceleration commanded by the operator through the accelerator 26, and the amount of electrical power to be delivered to the motor 12 in response to those operator inputs. In embodiments, the controller 24 operates in second or derate operating modes characterizing second or derate relationships between those operator inputs and the amount of power delivered to the motor 12 in response to those inputs.

Referring back to FIG. 1, embodiments of vehicle 10 can be seen to also include a controller 24 having a processor 50 and memory 52. The memory 52 stores data representative of power control relationships between the operator inputs and the amount of power to be applied to the traction motor 12 by the power distribution system 22. In particular, the memory 52 can store data representative of or characterizing a number of different power control relationships corresponding to different operating modes for the vehicle 10 and controller 24 (e.g., the normal and derate modes). Processor 50 processes the inputs received by the controller 24 (e.g., from the failure sensors 28, operator inputs such as accelerator 26 and others described herein) as a function of or based on the stored power control relationships, and produces the traction power control signals. The power distribution system 22 includes conventional or otherwise known components such as inverters and switches 54, and controls the flow of electric power from the rechargeable battery system 18 and/or the auxiliary power source 20 to the traction motor 12 as a function of or based on the received traction control power signals. A power source monitoring system 56 couples the on-board power sources 17 to controller 24, and provides inputs to the controller representative of parameters such as the charge levels of the rechargeable battery system 18 and/or auxiliary power source 20, and/or the power consumption, depletion rate or flow of energy from those on-board sources. Sensors providing information representative of vehicle characteristics or parameters to the controller 24 include vehicle weight sensor 60 and vehicle speed sensor 62.

FIG. 3 illustrates examples of failure sensors 28 that can be coupled to the controller 28. As shown, embodiments include a global positioning system (GPS) or other sensor 70 providing the controller 24 with information about the then-current location of the vehicle 10. Embodiments include charge level sensors 72 for monitoring the charge levels of rechargeable battery system 18 and/or fuel cell 40, and fuel level sensors 74 for monitoring the fuel level in fuel source 38 and/or fuel cell 40. Knowing the current vehicle location, and other information such as charge and/or fuel levels and the locations of expected recharge and/or refuel events during the mission (which can, for example, be stored in the memory 52), controller 14 can determine whether expected recharge or refuel events at certain locations occurred as planned. The failure or inability to recharge the rechargeable battery system 18 and/or fuel cell 40, and/or the failure or inability to refuel the fuel source 30 and/or fuel cell 40 at expected stops can be identified as failure events. Fault sensors 76 monitor the operation of the rechargeable battery system 18, internal combustion engine 34, generator 36 and/or fuel cell 40 and identify faults in the operation of those components as failure events. A switch 78 can be actuated by the operator of the vehicle 10 to manually identify a failure event if the operator is concerned about whether the on-board power sources 17 have sufficient energy to provide the vehicle with get home capability (e.g., in the absence of refueling or recharging).

Figure 4A:
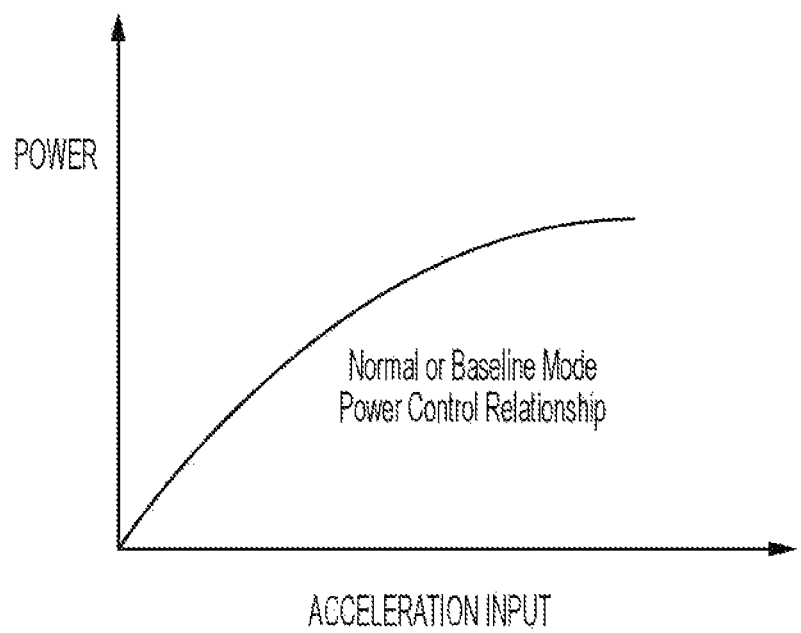
FIG. 4A is a graphical representation of an exemplary normal or baseline mode power control relationship for the vehicle in accordance with embodiments.

FIG. 4A is a graphical representation of an exemplary normal or baseline mode power control relationship for the vehicle 10. The power control relationship of FIG. 4A can be the optimized power control relationship for the vehicle 10, and can be the relationship used for vehicle operation in the absence of the identification of any failure events such as those provided by failure sensors 28. In response to the operator control inputs such as requested acceleration and/or braking, the controller 24 generates power control signals that causes the power distribution system 22 to apply power to the motor 12 in accordance with the illustrated relationship. Parameters for achieving the illustrated normal power control relationship can be stored in the memory 52 of controller 24.

Figure 4B:
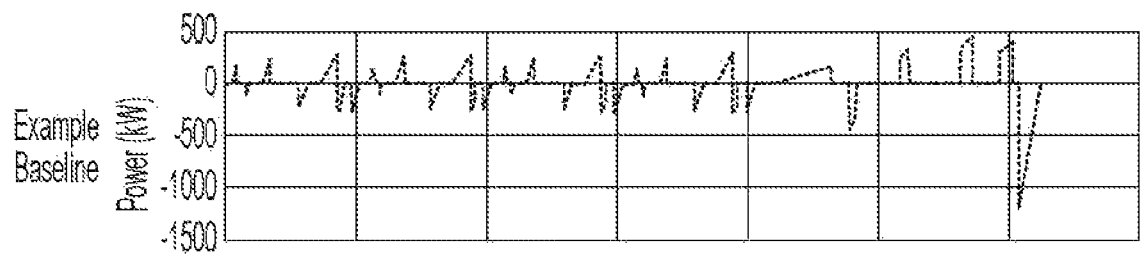
FIGS. 4B, 4C and 4D are graphical examples of modeled instantaneous power, state of charge (SOC) and speed performance parameters, respectively, of a vehicle operated using the power control relationship of FIG. 4A.
Figure 4C:
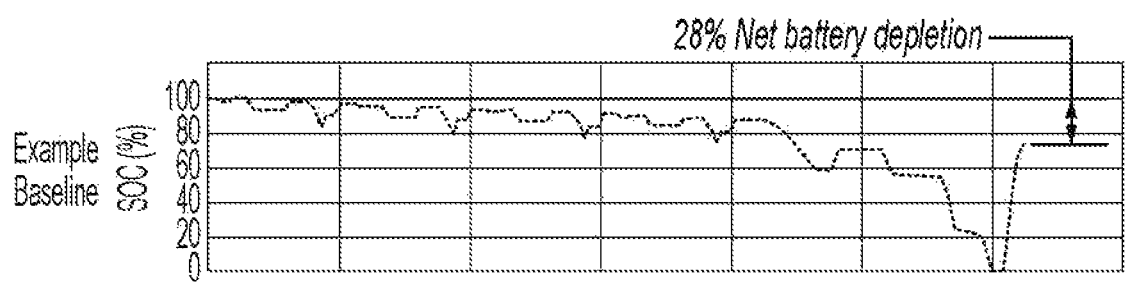
Figure 4D:
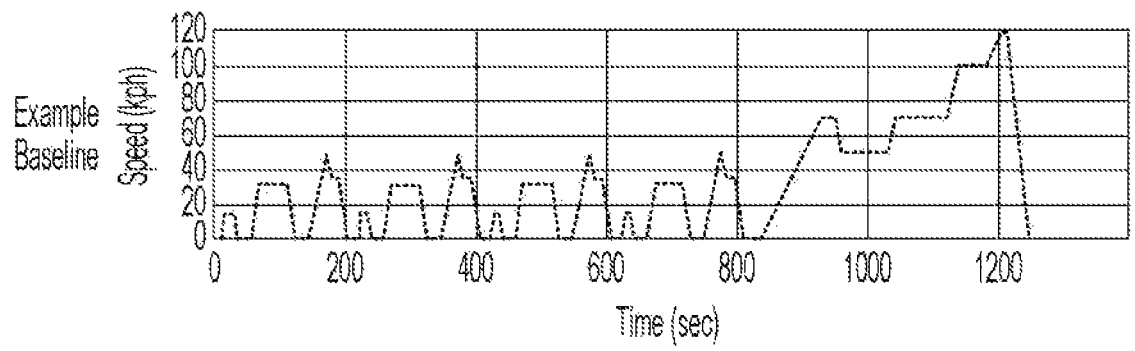

FIGS. 4B, 4C and 4D are graphical examples of various modeled performance parameters of a vehicle 10 operated using the normal or baseline power control relationship of FIG. 4A over a period of time corresponding to a vehicle trip or mission in response to a first series of operator inputs over the mission. In particular, FIG. 4B illustrates examples of the instantaneous power applied to the motor 12 at various times throughout the mission, and FIG. 4D illustrates the speed achieved by the vehicle at the corresponding times. Negative power consumption represents the effects of regenerative braking. FIG. 4C represents the state of charge (SOC) of the on-board energy sources 17 of the vehicle 10 at the various corresponding times throughout the mission. As shown in FIG. 4C, by this example the on-board energy sources 17 were depleted by 28% during the mission.

Figure 5A:
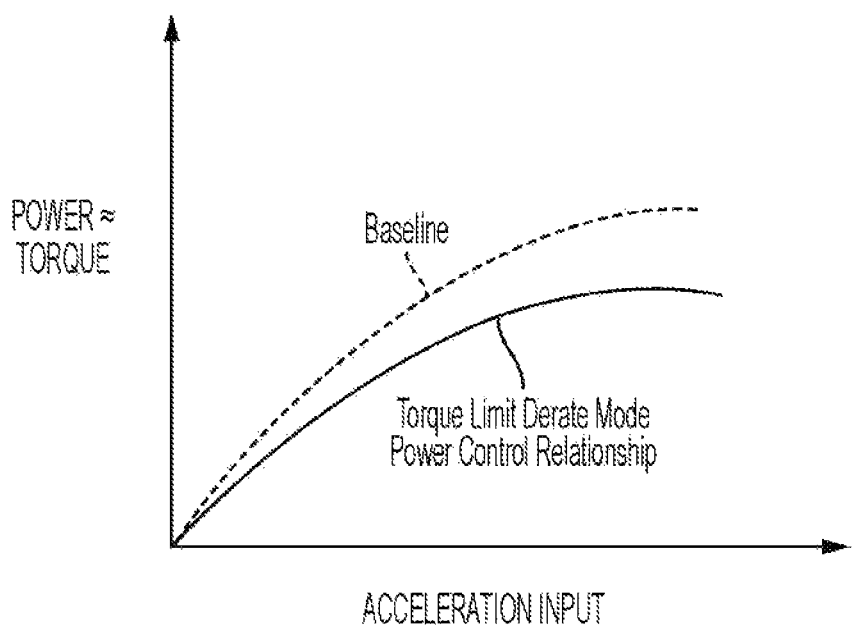
FIG. 5A is a graphical representation of an exemplary driveline torque limit derate mode power control relationship for a vehicle in accordance with embodiments.

FIG. 5A is a graphical representation of an exemplary driveline torque limit derate mode power control relationship for vehicle 10 in accordance with embodiments. For purposes of illustration, the torque limit derate mode power control relationship is shown in FIG. 5A with reference to the normal power control relationship (from FIG. 4A). In response to the operator control inputs such as requested acceleration and braking, the controller 24 generates power control signals that cause the power distribution system 24 to apply power to the motor 12 in accordance with the illustrated relationship that is more limited (i.e., derated) with respect to the normal power control relationship. Parameters for achieving the illustrated torque limited power control relationship can be stored in the memory 52 of controller 24.

Figure 5B:
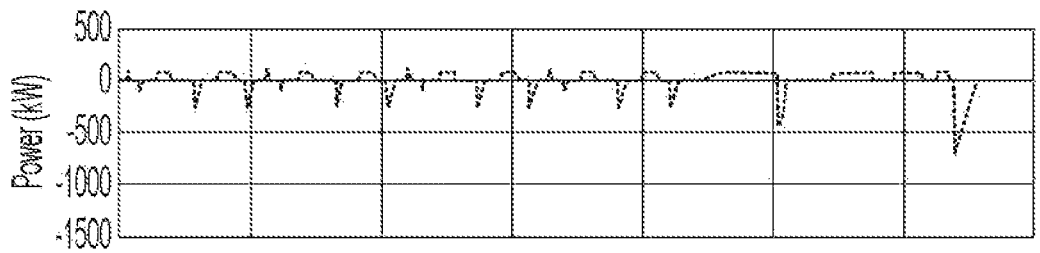
FIGS. 5B, 5C and 5D are graphical examples of modeled instantaneous power, state of charge (SOC) and speed performance parameters, respectively, of a vehicle operated using the power control relationship of FIG. 5A.
Figure 5C:
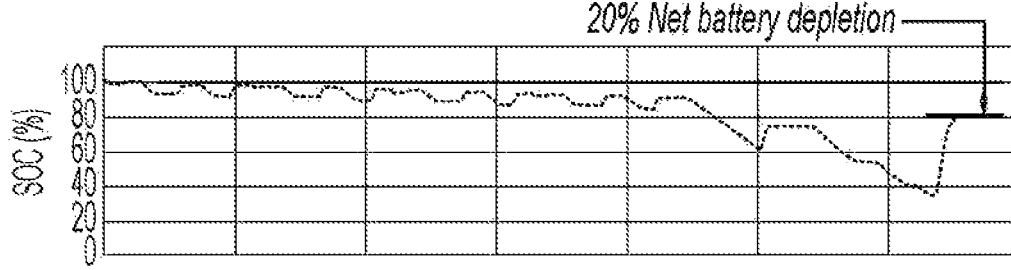
Figure 5D:
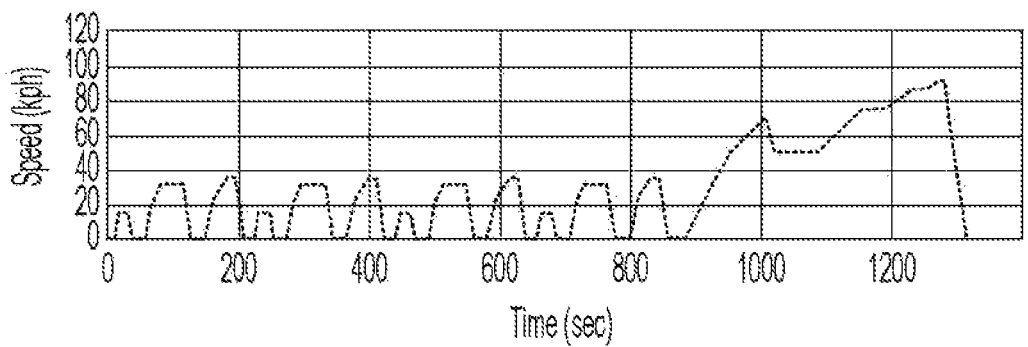

FIGS. 5B, 5C and 5D are graphical examples of modeled instantaneous power, state of charge (SOC) and speed performance parameters of a vehicle 10 operated using the torque limited power control relationship of FIG. 5A over a period of time corresponding to a vehicle trip or mission in response to the series of operator inputs over the mission used in connection with the example shown in FIGS. 4A-4D. As shown in FIG. 5C, by this example the on-board energy sources 17 were depleted by 20% during the trip. This represents a saving or conservation of about 8% of the energy of the on-board sources 17 over the power that would have been consumed during operation of the vehicle 10 in the normal mode. Because limiting torque has a more severe impact at higher speeds, the use of this torque limit derate mode may be suitable for vehicles with a transmission (i.e., less wheel torque in higher gears).

Figure 6A:
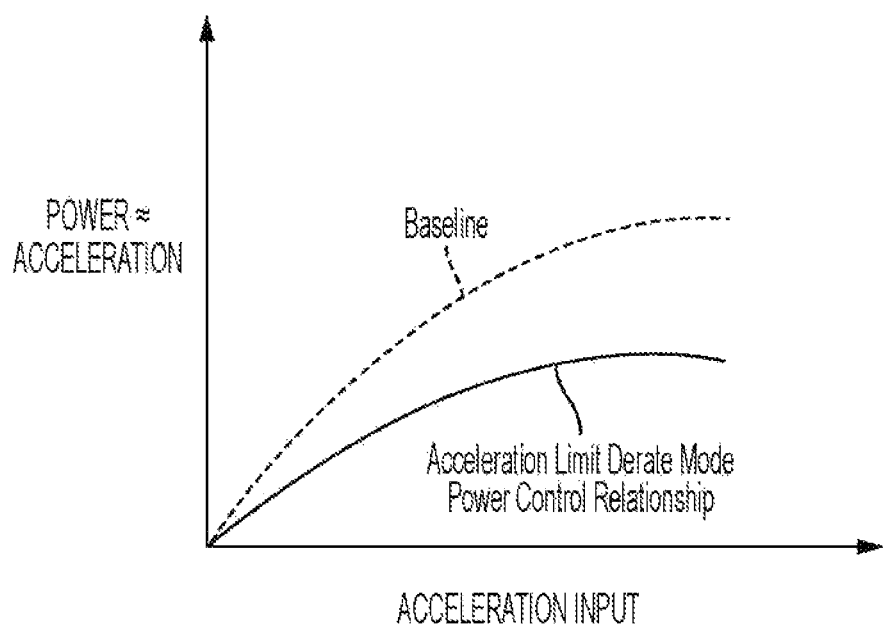
FIG. 6A is a graphical representation of an exemplary vehicle acceleration limit derate mode power control relationship for a vehicle in accordance with embodiments.

FIG. 6A is a graphical representation of an exemplary vehicle acceleration limit derate mode power control relationship for vehicle 10 in accordance with embodiments. For purposes of illustration, the acceleration limit derate mode power control relationship is shown in FIG. 6A with reference to the normal power control relationship. In response to the operator control inputs such as requested acceleration and braking, the controller 24 generates power control signals that cause the power distribution system 24 to apply power to the motor 12 in accordance with the illustrated relationship that is more limited (i.e., derated) with respect to the normal power control relationship. Parameters for achieving the illustrated acceleration limited power control relationship can be stored in the memory 52 of controller 24.

Figure 6B:
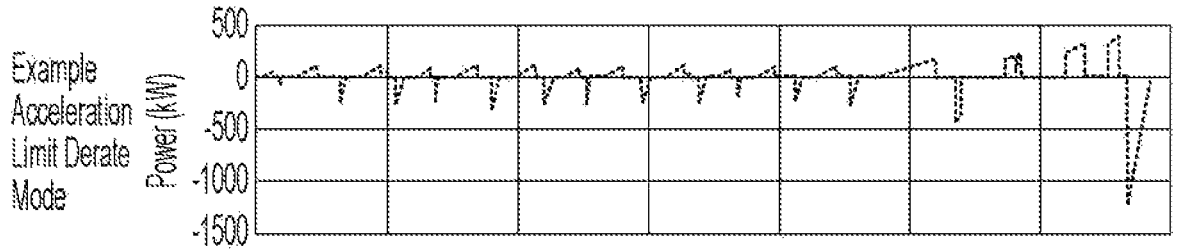
FIGS. 6B, 6C and 6D are graphical examples of modeled instantaneous power, state of charge (SOC) and speed performance parameters, respectively, of a vehicle operated using the power control relationship of FIG. 6A.
Figure 6C:
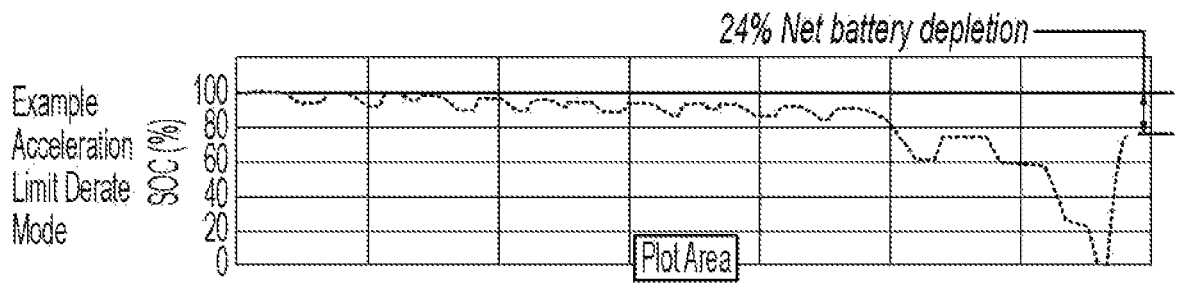
Figure 6D:
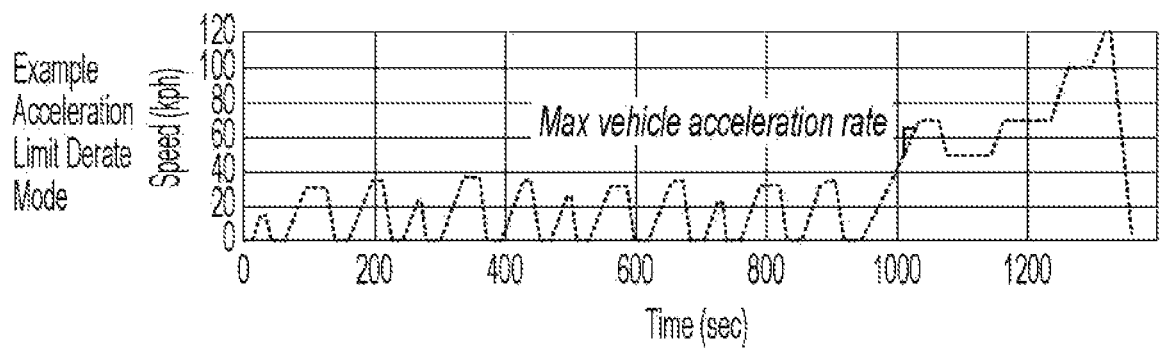

FIGS. 6B, 6C and 6D are graphical examples of modeled instantaneous power, state of charge (SOC) and speed performance parameters of a vehicle 10 operated using the acceleration limited power control relationship of FIG. 6A over a period of time corresponding to a vehicle trip or mission in response to the series of operator inputs over the mission used in connection with the example shown in FIGS. 4A-4D. A maximum vehicle acceleration rate is shown for purposes of example in FIG. 6D. As shown in FIG. 6C, by this example the on-board energy sources 17 were depleted by 24% during the trip. This represents a saving or conservation of about 4% of the energy of the on-board sources 17 over the power that would have been consumed during operation of the vehicle 10 in the normal mode.

Figure 7:
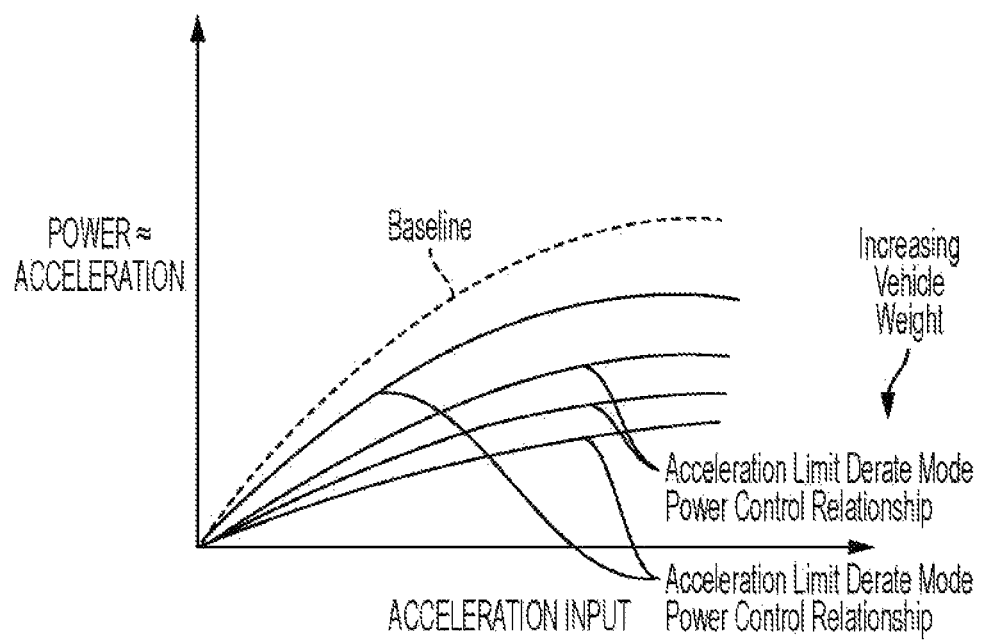
FIG. 7 is a graphical representation of an exemplary weight-based acceleration limit derate power control relationship for a vehicle in accordance with embodiments.

Each derate mode power control relationship can include a range or set of power control relationships based on other vehicle parameters. For example, FIG. 7 is a graphical representation of exemplary vehicle acceleration limit derate power control relationships for vehicle 10 that is based on vehicle weight (e.g., as monitored by sensor 60) in accordance with embodiments. As shown, in this example, the controller 24 causes lesser amounts of power to be applied to the motor 12 in response to the same requested vehicle acceleration with increasing weight of the vehicle 10. Stated differently, for the same amount or requested acceleration input, the controller 24 will cause lesser amounts of power to be applied to the motor 12 for a heavier vehicle 10 that a lighter vehicle.

Figure 8A:
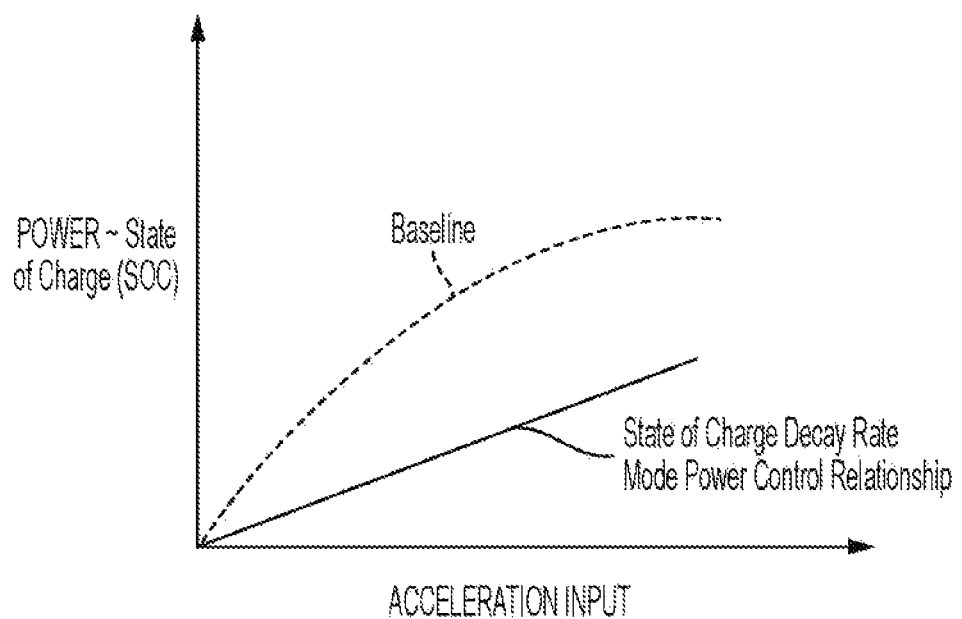
FIG. 8A is a graphical representation of an exemplary battery SOC (state of charge) limit derate mode power control relationship for a vehicle in accordance with embodiments.

FIG. 8A is a graphical representation of an exemplary battery SOC (state of charge) limit derate mode power control relationship for vehicle 10 in accordance with embodiments. For purposes of illustration, the SOC limit derate mode power control relationship is shown in FIG. 8A with reference to the normal SOC power control relationship. In response to the operator control inputs such as requested acceleration and braking, the controller 24 generates power control signals that cause the power distribution system 24 to apply power to the motor 12 in accordance with the illustrated relationship that is more limited (i.e., derated) with respect to the normal power control relationship. Parameters for achieving the illustrated acceleration limited power control relationship can be stored in the memory 52 of controller 24.

Figure 8B:
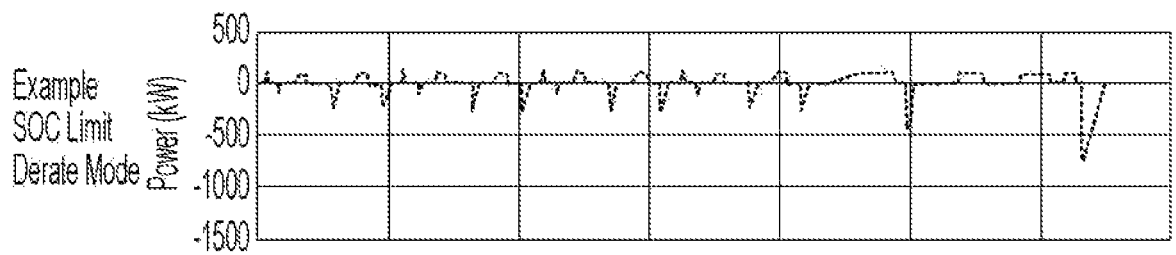
FIGS. 8B, 8C and 8D are graphical examples of modeled instantaneous power, state of charge (SOC) and speed performance parameters, respectively, of a vehicle operated using the SOC limited power control relationship of FIG. 8A.
Figure 8C:
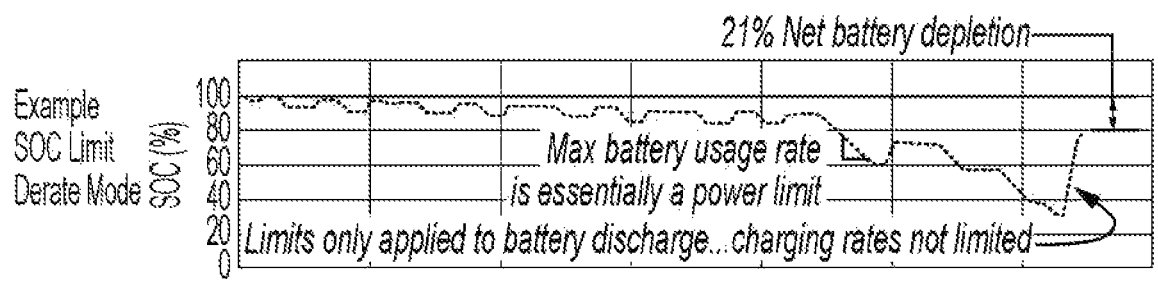
Figure 8D:
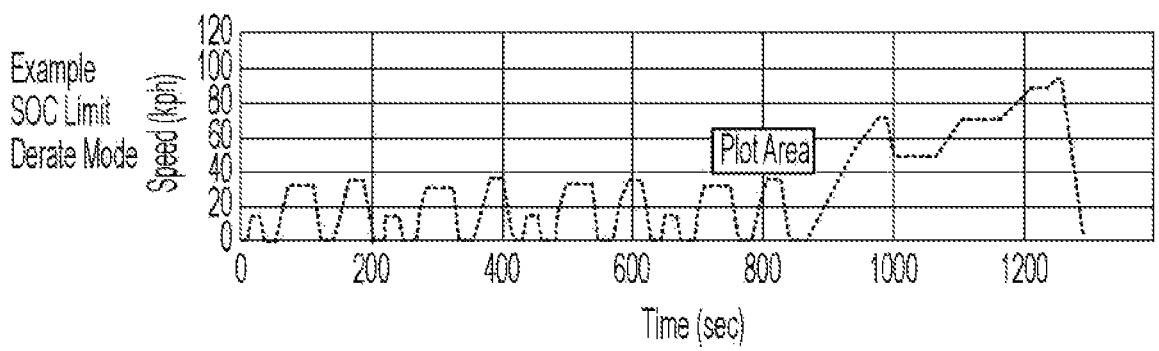

FIGS. 8B, 8C and 8D are graphical examples of modeled instantaneous power, state of charge (SOC) and speed performance parameters of a vehicle 10 operated using the SOC limited power control relationship of FIG. 8A over a period of time corresponding to a vehicle trip or mission in response to the series of operator inputs over the mission used in connection with the example shown in FIGS. 4A-4D. As shown in FIG. 8C, by this example the on-board energy sources 17 were depleted by 21% during the trip. This represents a saving or conservation of about 7% of the energy of the on-board sources 17 over the power that would have been consumed during operation of the vehicle 10 in the normal mode. As is also shown FIG. 8C, the maximum battery usage rate is effectively a power limit. In the illustrated embodiment, the SOC limits apply to battery discharge, and charging rates are not limited.

Figure 9A:
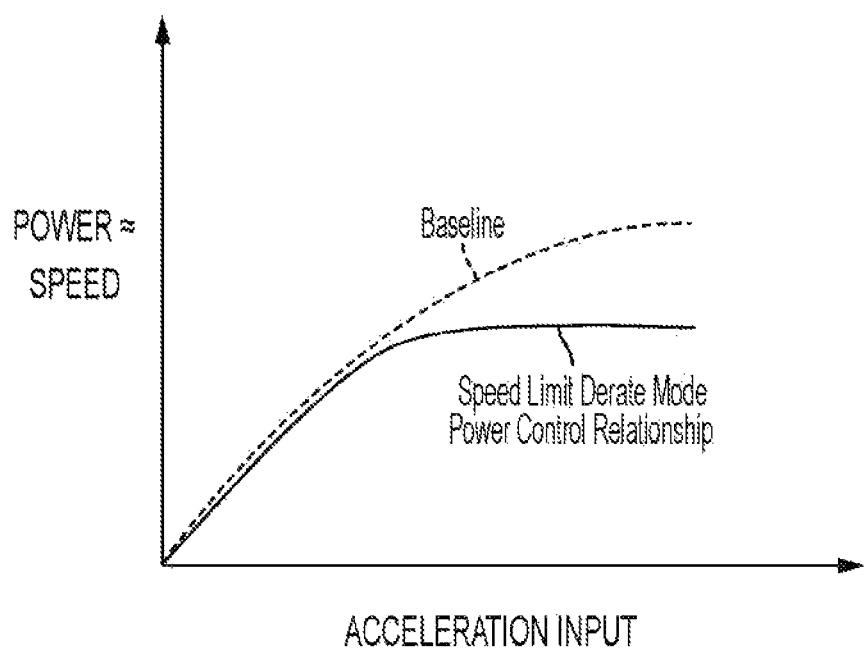
FIG. 9A is a graphical representation of an exemplary vehicle speed limit derate mode power control relationship for a vehicle in accordance with embodiments.

FIG. 9A is a graphical representation of an exemplary vehicle speed limit derate mode power control relationship for vehicle 10 in accordance with embodiments. For purposes of illustration, the speed limit derate mode power control relationship is shown in FIG. 9A with reference to the normal power control relationship. In response to the operator control inputs such as requested acceleration and braking, the controller 24 generates power control signals that cause the power distribution system 24 to apply power to the motor 12 in accordance with the illustrated relationship that is more limited (i.e., derated) with respect to the normal power control relationship. Parameters for achieving the illustrated speed limited power control relationship can be stored in the memory 52 of controller 24.

Figure 9B:
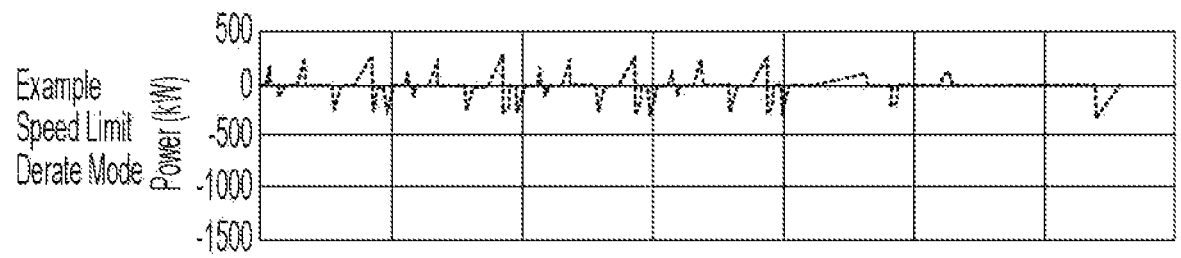
FIGS. 9B, 9C and 9D are graphical examples of modeled instantaneous power, state of charge (SOC) and speed performance parameters, respectively, of a vehicle operated using the speed limited power control relationship of FIG. 9A.
Figure 9C:
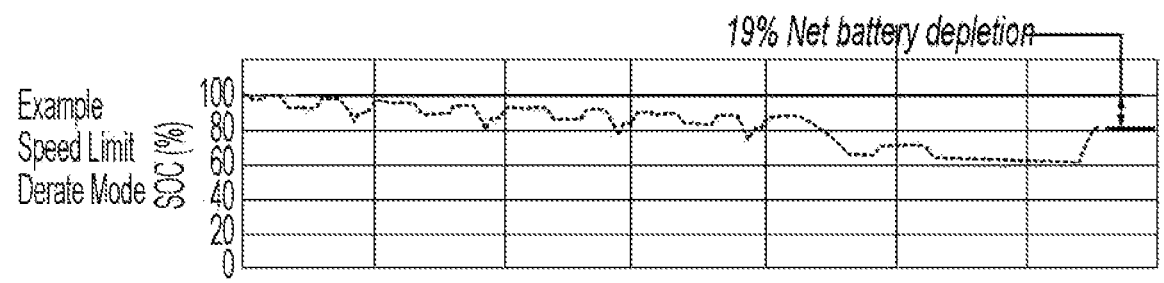
Figure 9D:
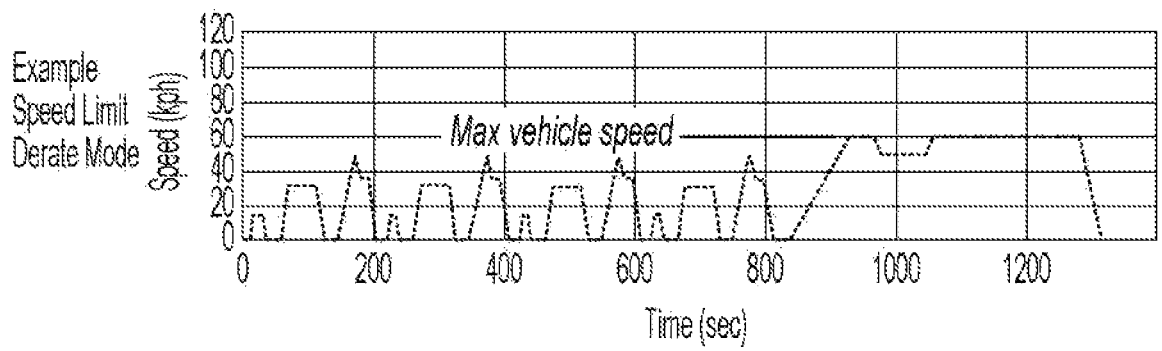

FIGS. 9B, 9C and 9D are graphical examples of modeled instantaneous power, state of charge (SOC) and speed performance parameters of a vehicle 10 operated using the speed limited power control relationship of FIG. 9A over a period of time corresponding to a vehicle trip or mission in response to the series of operator inputs over the mission used in connection with the example shown in FIGS. 4A-4D. A maximum vehicle speed is shown for purposes of example in FIG. 9D. As shown in FIG. 9C, by this example the on-board energy sources 17 were depleted by 19% during the trip. This represents a saving or conservation of about 9% of the energy of the on-board sources 17 over the power that would have been consumed during operation of the vehicle 10 in the normal mode. Limiting vehicle speed can, for example, avoid relatively high and unrecoverable power losses associated with aerodynamic drag at relatively high vehicle speeds. A maximum vehicle speed is shown in the illustrated examples.

Figure 10A:
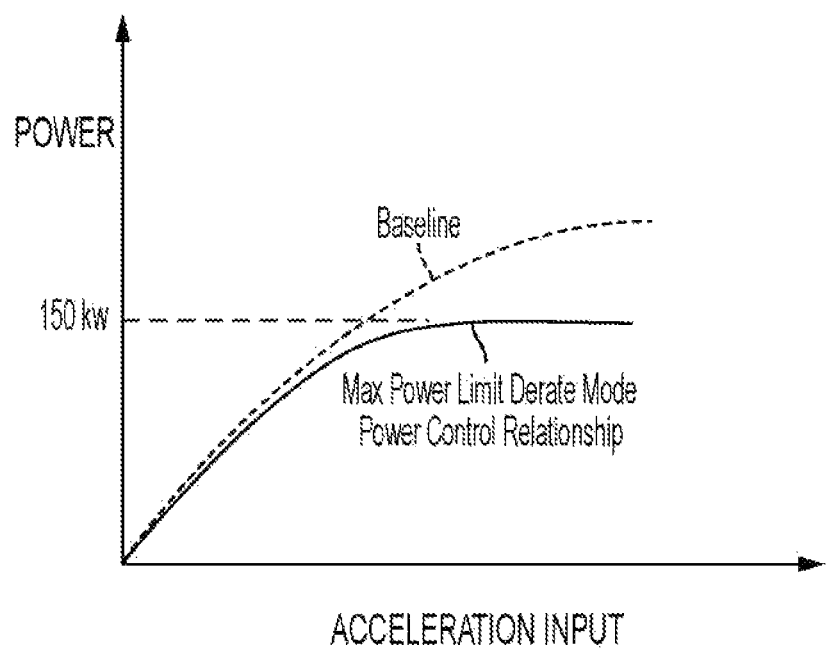
FIG. 10A is a graphical representation of a maximum power limited derate mode power control relationship for vehicles in accordance with embodiments, which can be used on vehicles of different weights.
Figure 10B:
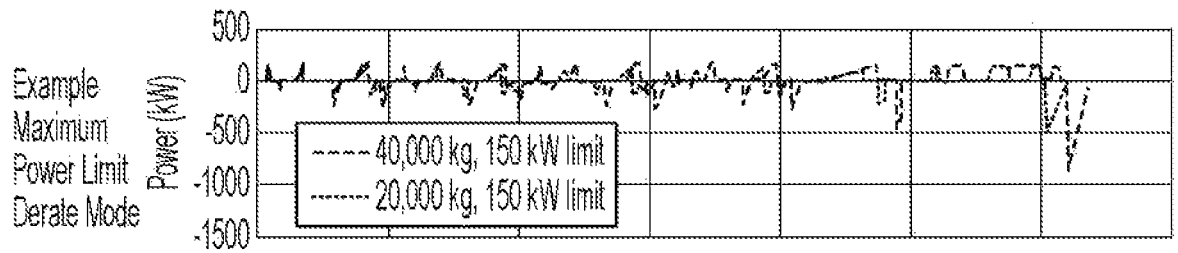
FIGS. 10B, 10C and 10D are graphical examples of modeled instantaneous power, state of charge (SOC) and speed performance parameters, respectively, for vehicles of different weights operated using the maximum power limited power control relationship of FIG. 10A.
Figure 10C:
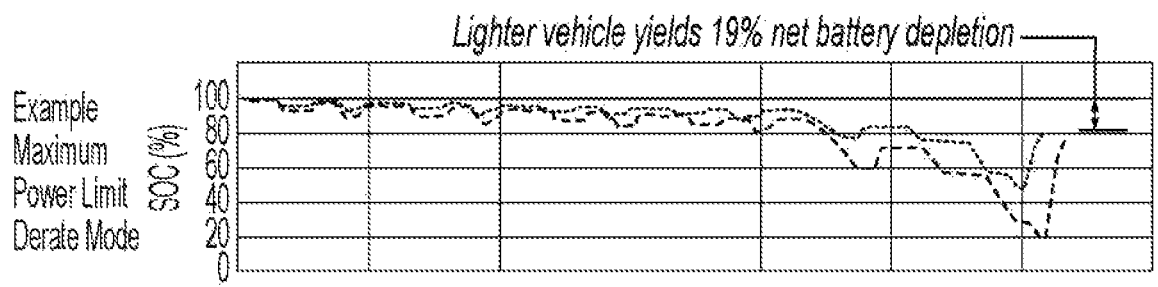
Figure 10D:
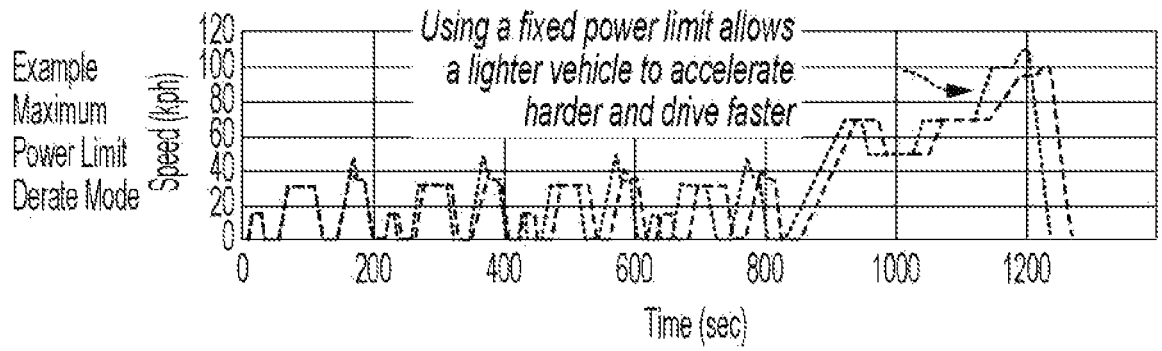

Additional embodiments using vehicle weight as a basis for derate mode operation can be described with reference to FIGS. 10A-10D. FIG. 10A is a graphical representation of a maximum power limited derate mode power control relationship for vehicles 10 in accordance with embodiments, which can be used on vehicles of different weights (e.g., a 40,000 kg vehicle and a 20,000 kg vehicle). FIGS. 10B, 10C and 10D illustrate graphical examples of modeled instantaneous power, state of charge (SOC) and speed performance parameters for both a 40,000 kg vehicle and a 20,000 kg vehicle operated using the maximum power limited power control relationship of FIG. 10A over a period of time corresponding to vehicle trips or missions in response to the series of operator inputs over the mission used in connection with the example shown in connection with FIGS. 4A-4D. As illustrated in FIG. 10C, the lighter, 20,000 kg vehicle had a 19% net power depletion over the trip, an amount that was less than the power depletion of the heavier, 40,000 kg vehicle. As illustrated in FIG. 10D, the vehicle weight independent power limit mode allows the lighter vehicle to accelerate harder and drive faster.

Figure 11A:
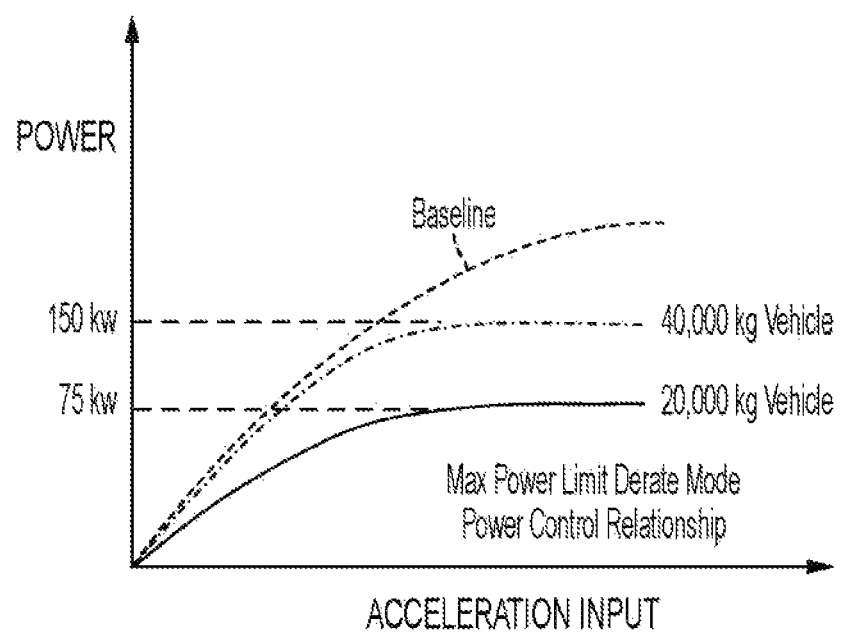
FIG. 11A is a graphical representation of exemplary weight-based maximum power limit derate mode power control relationships for vehicles in accordance with embodiments.

FIG. 11A is a graphical representation of exemplary weight-based maximum power limit derate mode power control relationships for vehicles 10 in accordance with embodiments. For purposes of illustration, the maximum power limit derate mode power control relationships are shown in FIG. 11A with reference to the normal power control relationship of FIG. 4A. In response to the operator control inputs such as requested acceleration and braking, the controller 24 generates power control signals that cause the power distribution system 24 to apply power to the motor 12 in accordance with the illustrated relationships that are more limited (i.e., derated) with respect to the normal power control relationship and based in the weight of the vehicle (e.g., as measured by sensor 60). Parameters for achieving the illustrated weight-based maximum power limited power control relationship can be stored in the memory 52 of controller 24. FIG. 11A illustrates power control relationships for a 40,000 kg vehicle (having a 150 kW power limit) and a 20,000 kg vehicle (having a 75 kW power limit) for purposes of example, but other embodiments include different power control relationships for vehicles of different weights.

Figure 11B:
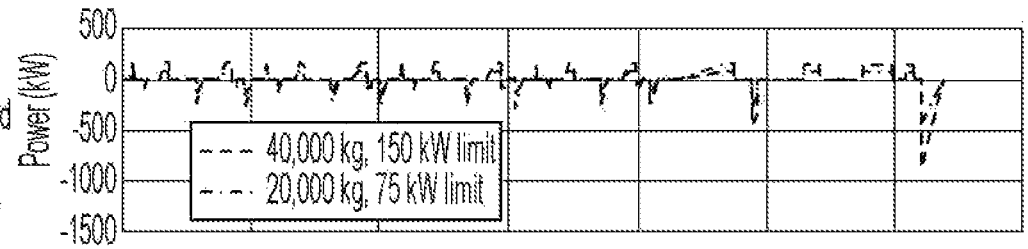
FIGS. 11B, 11C and 11D are graphical examples of modeled instantaneous power, state of charge (SOC) and speed performance parameters, respectively, of vehicles operated using the maximum limited power control relationships of FIG. 11A.
Figure 11C:
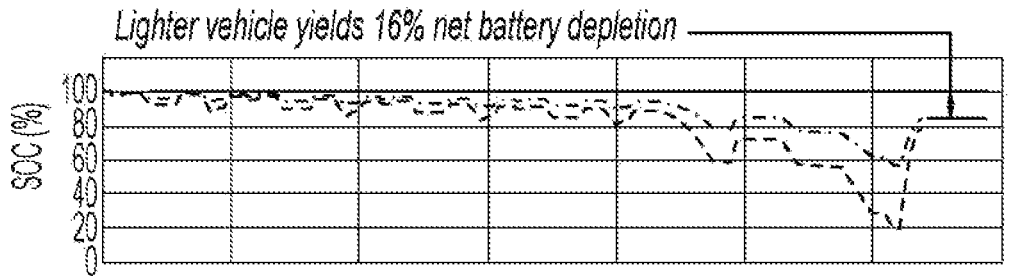
Figure 11D:
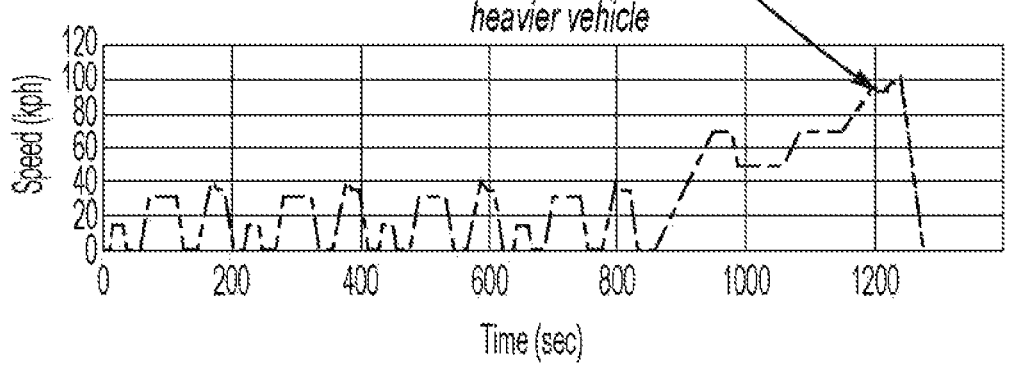

FIGS. 11B, 11C and 11D are graphical examples of modeled instantaneous power, state of charge (SOC) and speed performance parameters of vehicles such as 10 operated using the maximum limited power control relationships of FIG. 11A over a period of time corresponding to a vehicle trip or mission in response to the series of operator inputs over the mission used in connection with the example shown in FIGS. 4A-4D. As shown in FIG. 11C, by this example the on-board energy sources 17 were depleted by 16% by the 20,000 kg vehicle during the trip. This represents a saving or conservation of about 12% of the energy of the on-board sources 17 over the power that would have been consumed during operation of the vehicle 10 in the normal mode. As shown by FIG. 11D, weight-based power limits save more energy and result in drivability of the lighter (e.g., 20,000 kg) vehicle no worse than the heavier (e.g., 40,000 kg) vehicle.

The described embodiments offer important advantages. For example, they provide enhanced get-home capability and reduce the likelihood of stranded vehicles when certain fault conditions are identified.

In embodiments, the controller 24 can comprise a processor, a controller, a digital logic circuit, and a computer. The controller 24 can comprise or be coupled to memory (volatile memory such as RAM, and non-volatile memory such as, a magnetic memory, a ROM and a EEPROM), a communication interface (such as on-board diagnostics (OBD-II), an input (such as switches, keypad, trackpad, and the like) and an output (such as a display). The controller 24 also may comprise a communication module for sending messages and signals to and receiving messages and signals back from a fleet or back office. The communication module can be capable to communication over one or more wireless or wired technologies. For example, the communication module can be capable of communicating over WiFi, Bluetooth, cellular network, satellite network and the like.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in associate with another embodiment. The scope of the invention should, therefore, be determined with reference to the appended claims, along with the full scope of equivalents to which such claims are entitled.

What is claimed is:

1. An all electric plug-in electric vehicle, comprising:
   one or more electric traction motors coupled to one or more wheels as the sole source of motive power for the vehicle, wherein the plug-in electric vehicle is free from an internal combustion engine mechanically coupled to the one or more wheels;
   a rechargeable battery system including one or more batteries, wherein the rechargeable battery system is;
   connectable to an external electrical source to recharge the rechargeable battery system;
   an auxiliary electric power source;
   a power distribution system responsive to power control signals to controllably couple electric power from the rechargeable battery system and the auxiliary electric power source to the one or more electric traction motors;
   one or more operator controls to provide operator vehicle control signals;
   one or more failure sensors, each sensor identifying a vehicle condition indicating a battery charge limitation and providing failure signals representative of the battery charge limitation; and
   a controller coupled to the power distribution system, the one or more operator controls and the one or more failure sensors, the controller configured to produce the power control signals and to operate in a normal mode and one or more of a plurality of derate modes, wherein:
   the controller produces normal traction power control signals in response to the operator control signals during operation in the normal mode, and wherein power of the rechargeable battery system and/or the auxiliary electric power source are depleted at a first rate during operation of the vehicle when the controller is operating in the normal mode; and
   in response to the failure signals, the controller selects one or more of the plurality of derate modes, and produces derated traction power control signals in accordance with the selected one or more of the plurality of derate modes in response to the operator control signals during operation in the one or more of the plurality of derate modes, wherein power of the rechargeable battery system and/or the auxiliary electric power source are depleted at a second rate during operation of the vehicle when the vehicle controller is operating in the one or more of the plurality of derate modes, and wherein the second rate is less than the first rate to conserve the power of the rechargeable battery system and/or the auxiliary power source.

2. The plug-in electric vehicle of claim 1, wherein the auxiliary electric power source includes one or both of:
   a genset including an internal combustion engine and a generator driven by the internal combustion engine; or
   a fuel cell.

3. The plug-in electric vehicle of claim 1 wherein the one or more failure sensors comprise one or more of (1) an operator actuated switch that can be used by an operator to "manually" command operation in the one or more of the plurality of derate modes, (2) a sensor indicating low fuel for an internal combustion engine coupled to a generator, (3) a sensor indicating a generator fault, (4) a sensor indicating an internal combustion engine fault, (5) a sensor indicating a failure to recharge the rechargeable battery system via the charger, or (6) a sensor indicating a failure of the rechargeable battery system, or (7) a failure of a fuel cell.

4. The plug-in electric vehicle of claim 3 wherein the plurality of derate modes includes a drive line torque limit mode, wherein during the drive line torque limit mode the controller operates the one or more electric traction motors to cause the vehicle to operate at limited acceleration rates and/or limited speeds.

5. The plug-in electric vehicle of claim 3 wherein the plurality of derate modes includes a vehicle acceleration limit mode, wherein during the vehicle acceleration limit mode the controller operates the one or more electric traction motors to cause the vehicle to operate at limited acceleration rates.

6. The plug-in electric vehicle of claim 5 wherein the vehicle further includes a weight sensor coupled to the controller, and wherein during the vehicle acceleration limit mode the controller causes an amount of electric power delivered to the one or more electric traction motors to be based on vehicle weight.

7. The plug-in electric vehicle of claim 3 wherein the plurality of derate modes includes a battery discharge rate limit mode, wherein during the battery discharge rate limit mode the controller operates the one or more electric traction motors to limit a discharge rate of the rechargeable battery system, and/or to limit the discharge rate of a fuel cell.

8. The plug-in electric vehicle of claim 7 wherein the vehicle further includes a battery power consumption sensor coupled to the controller.

9. The plug-in electric vehicle of claim 3 wherein the plurality of derate modes includes a speed limit mode, wherein during the speed limit mode the controller operates the one or more electric traction motors to cause the vehicle to operate at limited speeds.

10. The plug-in electric vehicle of claim 9 wherein the vehicle further includes a speed sensor coupled to the vehicle controller.

11. A method for controlling the distribution of power to one or more electric traction motors providing the sole source of motive power in an all electric plug-in electric vehicle having a plurality of on-board sources of electric power, comprising:
    motively driving one or more wheels of the vehicle by the one or more electric traction motors to provide the sole source of motive power in the vehicle, wherein the plug-in electric vehicle is free from an internal combustion engine mechanically coupled to the one or more wheels;
    receiving an operator control input;
    sensing one or more vehicle failure conditions indicating a charge limitation of the plurality of on-board sources of power;
    distributing power from one or more of the plurality of on-board sources of power to the one or more electric traction motors at a first power control relationship in response to the operator control input during operation in a normal mode in the absence of vehicle failure conditions, wherein power of the one or more on-board sources of power is depleted at a first rate during operation of the vehicle during operation in the normal mode; and distributing power from one or more of the plurality of on-board sources of power to the one or more electric traction motors at a second power control relationship in response to the operator control input during operation in one or more of a plurality of derate modes in response to a sensed vehicle failure condition, wherein power of the one or more on-board sources of power is depleted at a second rate during operation of the vehicle during operation in the one or more of the plurality of derate modes, and wherein the second rate is less than the first rate to conserve the power of the one or more on-board sources of power.

12. The method of claim 11 wherein the plurality of derate modes includes a drive line torque limit mode, and wherein during the drive line torque limit mode power is distributed to the one or more electric traction motors to cause the vehicle to operate at limited acceleration rates and/or limited speeds.

13. The method of claim 11 wherein the plurality of derate modes includes a vehicle acceleration limit mode, and wherein during the vehicle acceleration limit mode power is distributed to the one or more electric traction motors to cause the vehicle to operate at limited acceleration rates.

14. The method of claim 13 wherein during the vehicle acceleration limit mode power is distributed to the one or more electric traction motors based on vehicle weight.

15. The method of claim 11 wherein the plurality of derate modes includes a battery discharge rate limit mode, and wherein during the battery discharge rate limit mode power is distributed to the one or more electric traction motors to limit a discharge rate of one or more of the on-board sources of electric power.

16. The method of claim 11 wherein the plurality of derate modes includes a speed limit mode, and wherein during the speed limit mode power is distributed to the one or more electric traction motors to cause the vehicle to operate at limited speeds.

17. The method of claim 11 for controlling the distribution of power to the one or more electric traction motors in a plug-in electric vehicle including a rechargeable battery system including one or more batteries, and an auxiliary electric power source comprising one or both of a genset including an internal combustion engine and a generator driven by the internal combustion engine, or a fuel cell.

18. The method of claim 17 wherein sensing one or more vehicle failure conditions comprises one or more of (1) sensing a manual derate mode operation command, (2) sensing a low fuel condition, wherein the fuel is used to power a genset, (3) sensing a generator fault condition, (4) sensing an internal combustion engine fault, wherein the internal combustion engine is a component of a genset, or (5) a battery system recharge fault condition.

19. The method of claim 11 wherein sensing one or more vehicle failure conditions comprises one or more of (1) sensing a manual derate mode operation command, (2) sensing a low fuel condition, wherein the fuel is used to power a genset, (3) sensing a generator fault condition, (4) sensing an internal combustion engine fault, wherein the internal combustion engine is a component of a genset, or (5) a battery system recharge fault condition.

20. A controller for controlling the distribution of power to one or more electric traction motors providing the sole source of motive power to wheels in an all electric plug-in electric vehicle having a plurality of on-board sources of electric power, wherein the plug-in electric vehicle is free from an internal combustion engine mechanically coupled to the wheels, wherein the controller is configured to:

distribute power from the one or more of the plurality of on-board sources of power to the one or more electric traction motors providing the sole source of motive power in the vehicle at a first or normal power control relationship in response to an operator control input during operation in a first mode, wherein power of the one or more on-board sources of power is depleted at a first rate during operation of the vehicle in the first mode; and distribute power from the one or more of the plurality of on-board sources of power to the one or more electric traction motors providing the sole source of motive power in the vehicle at a second power control relationship in response to the operator control input during operation in one or more of a plurality of derate modes in response to a sensed vehicle failure condition, wherein power of the one or more on-board sources of power is depleted at a second rate during operation of the vehicle during operation in the one or more of the plurality of derate modes, and wherein the second rate is less than the first rate to conserve the power of the one or more onboard sources of power.

* * * * *